April 11, 1961   B. M. FAIREST   2,978,854
BOTTLE-CRATING MACHINES
Filed April 9, 1958   10 Sheets-Sheet 5
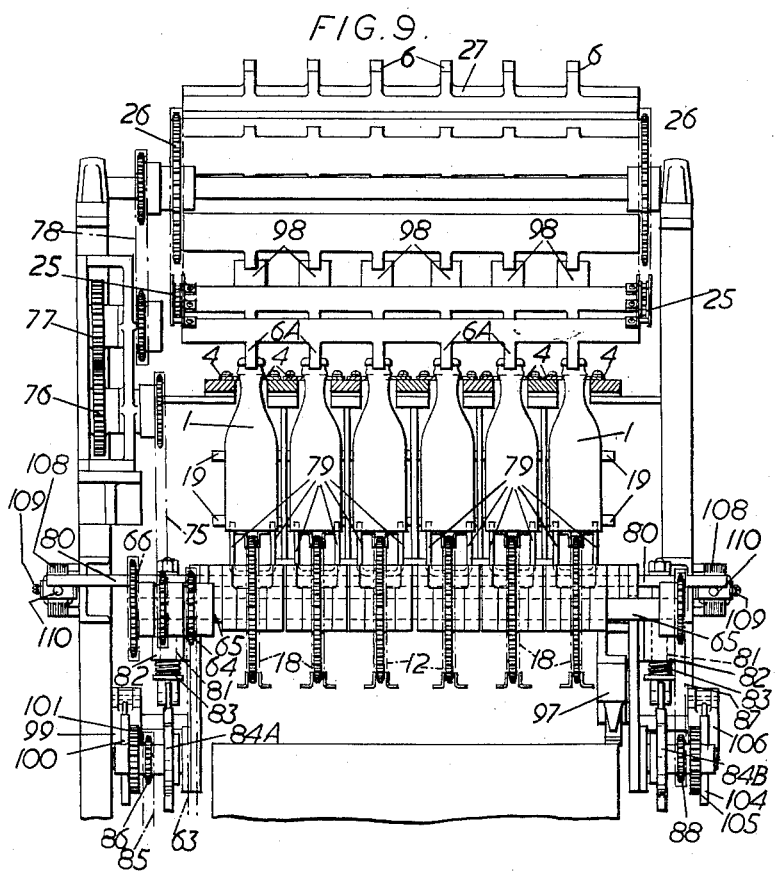
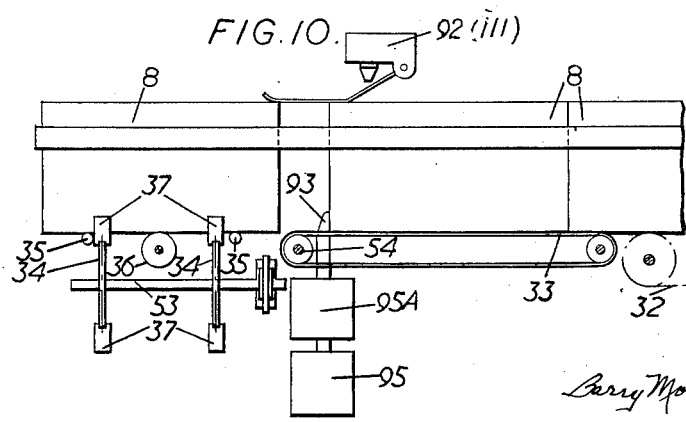

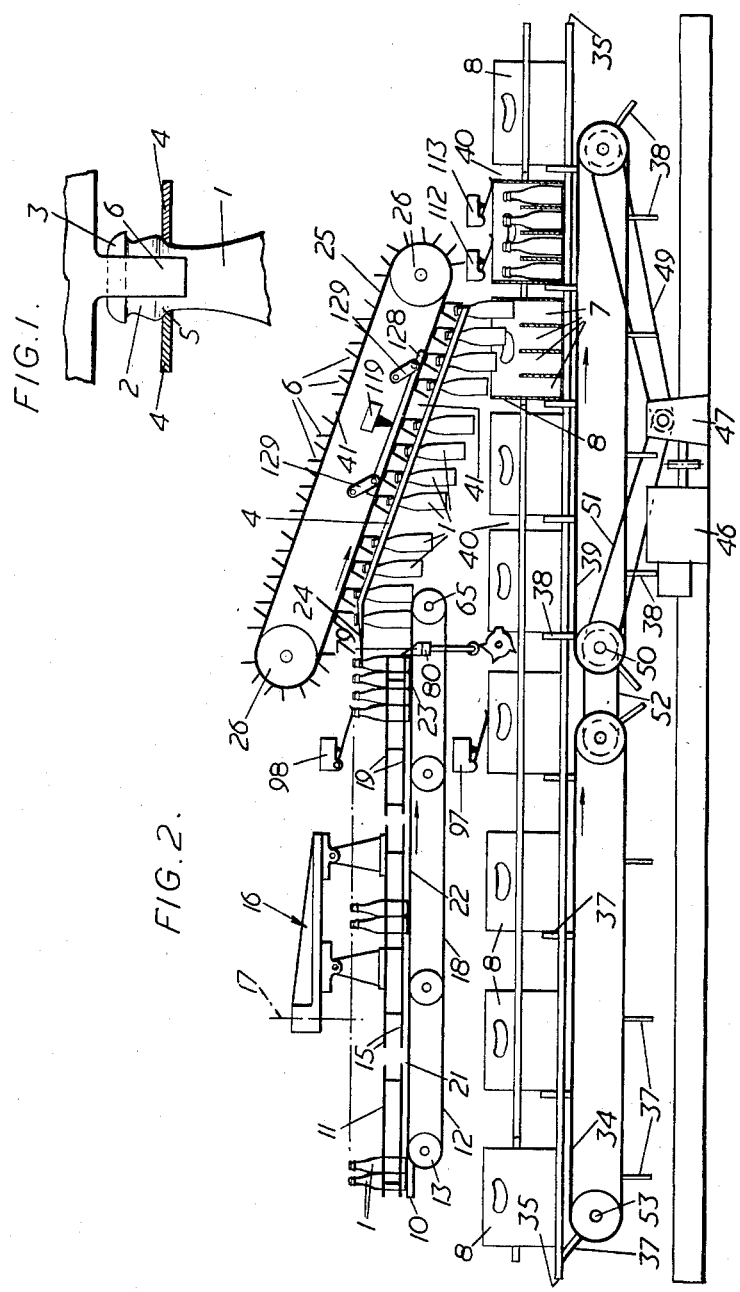

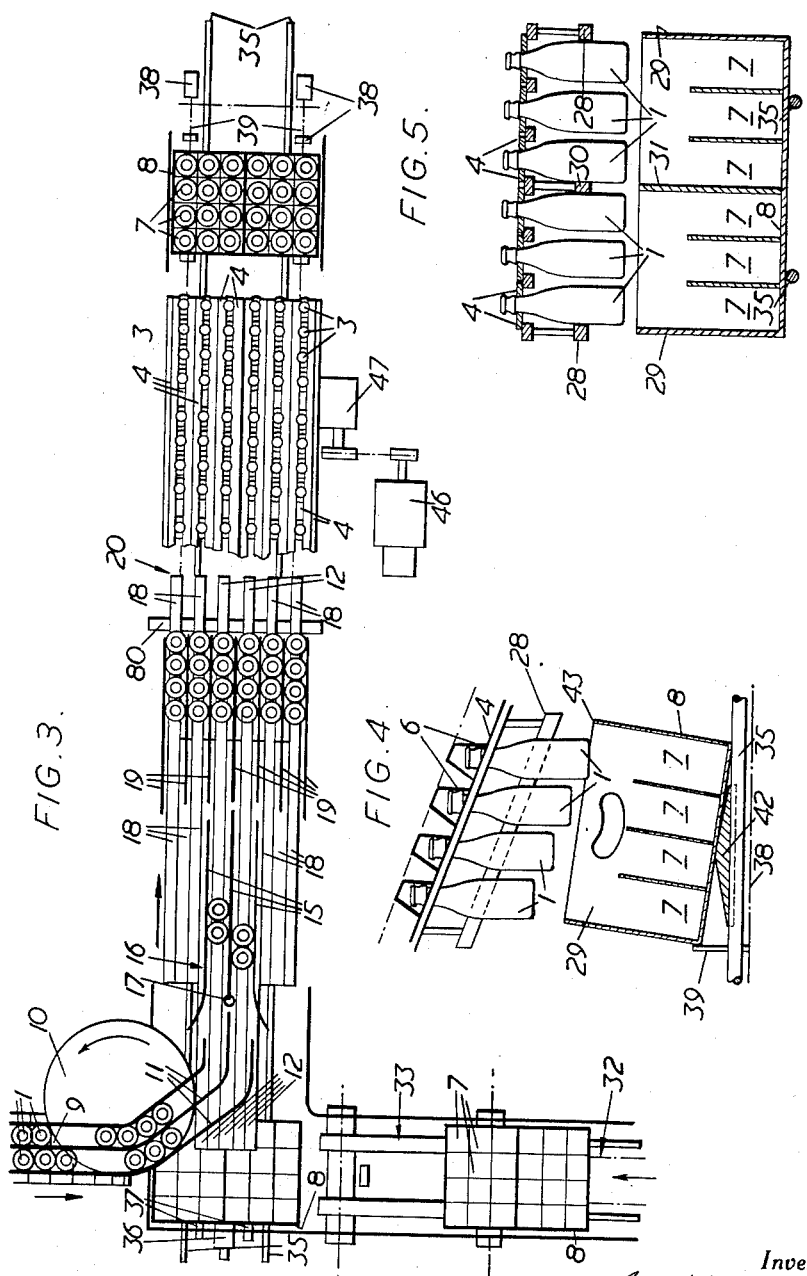

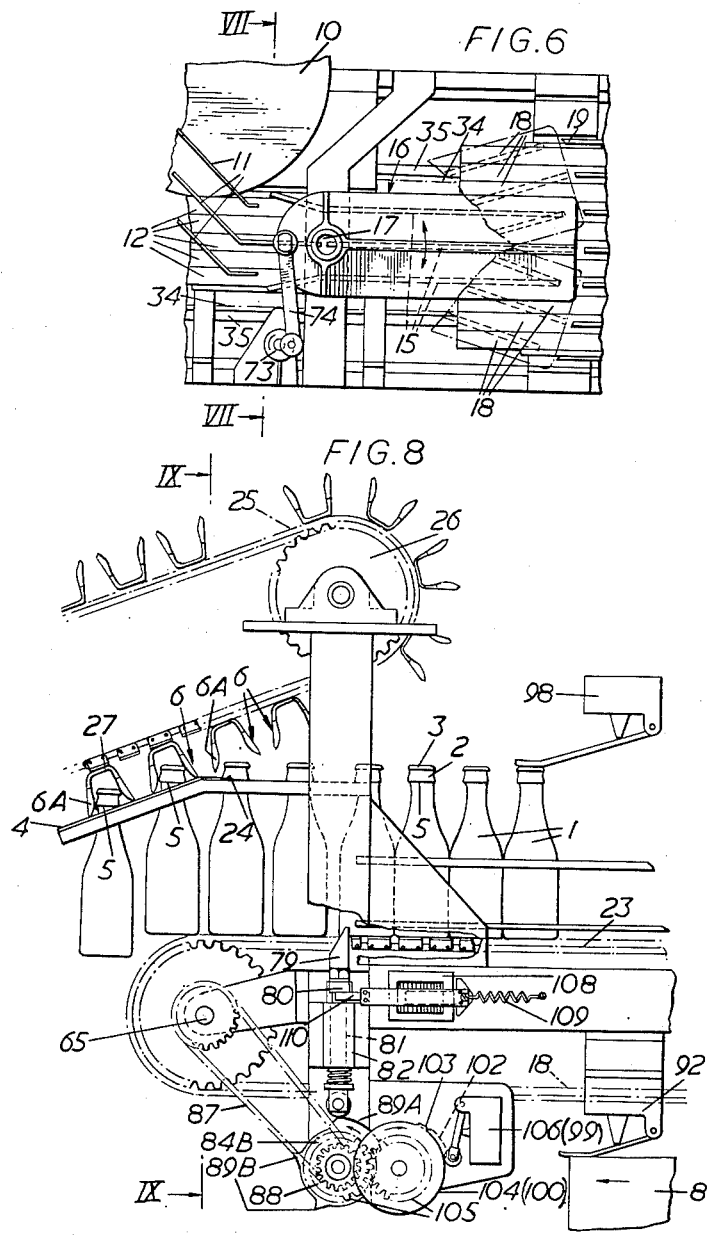

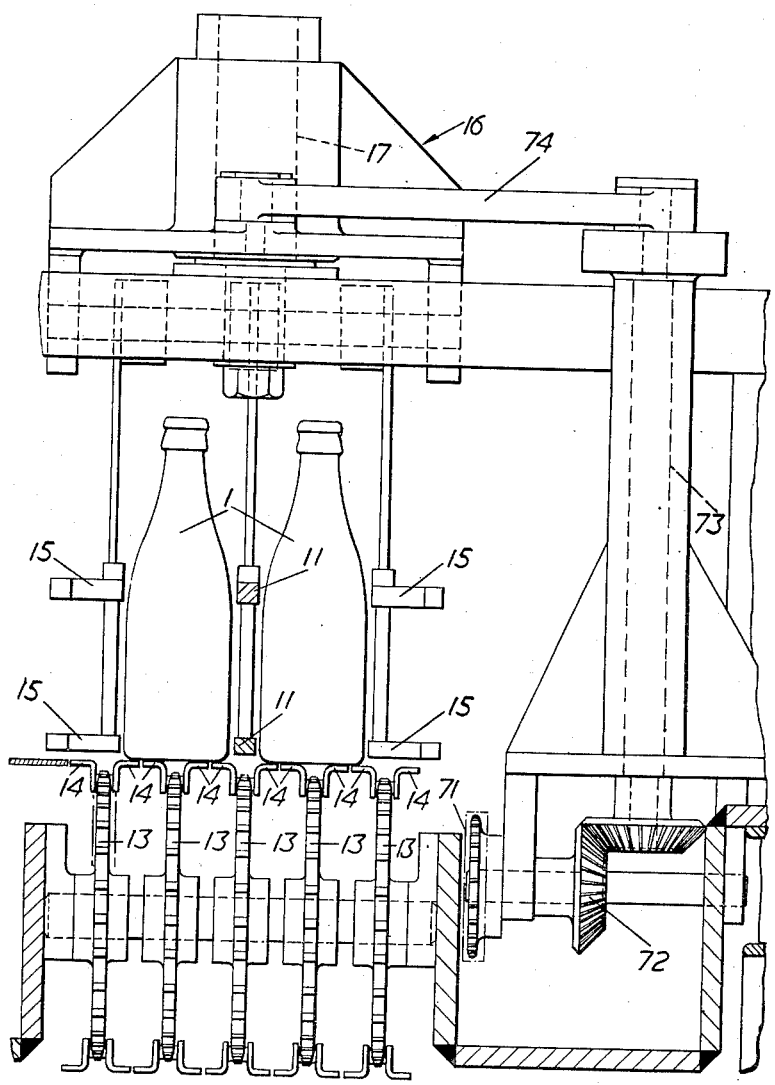

April 11, 1961 B. M. FAIREST 2,978,854
BOTTLE-CRATING MACHINES
Filed April 9, 1958 10 Sheets-Sheet 6

Inventor
Barry Morgan Fairest
By
Watson, Cole, Grindle & Watson
Attorney

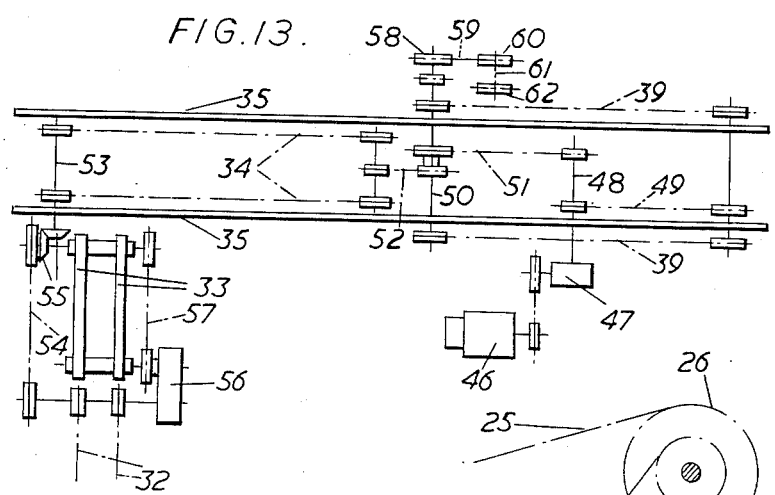
FIG.13.
FIG.15.
FIG.14.

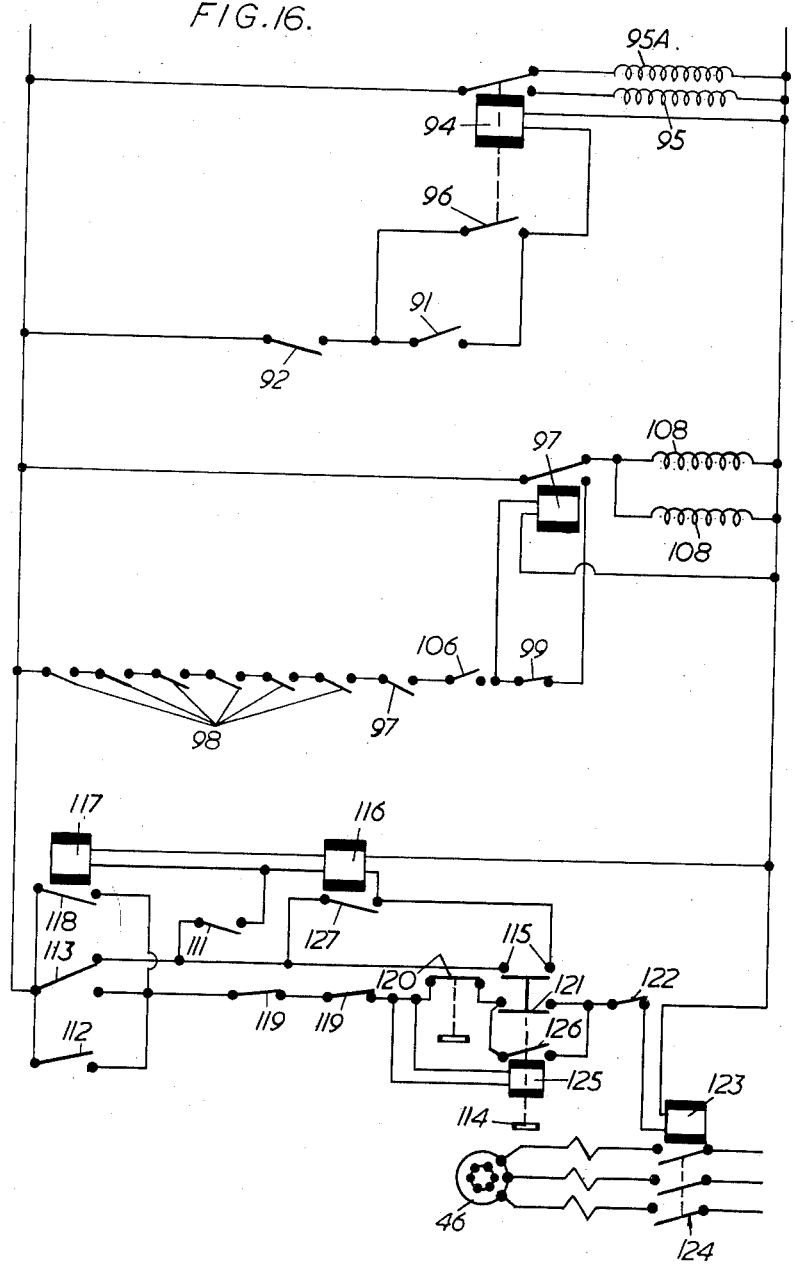

April 11, 1961　　　B. M. FAIREST　　　2,978,854
BOTTLE-CRATING MACHINES
Filed April 9, 1958　　　　　　　　　　10 Sheets-Sheet 9
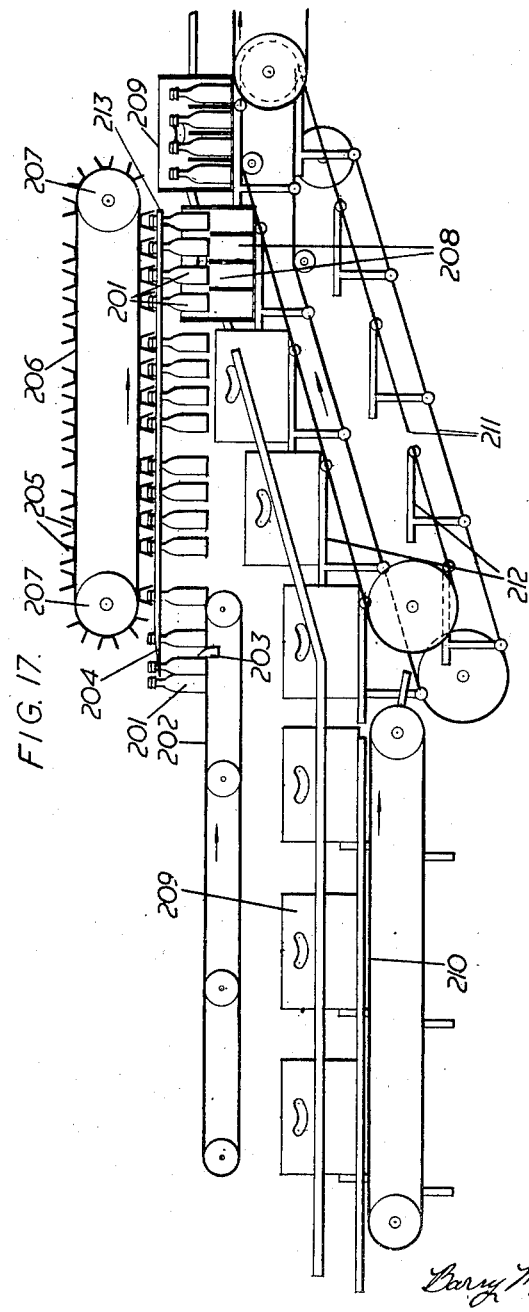
Inventor
Barry Morgan Fairest
By Watson, Cole, Grindle & Watson
Attorney

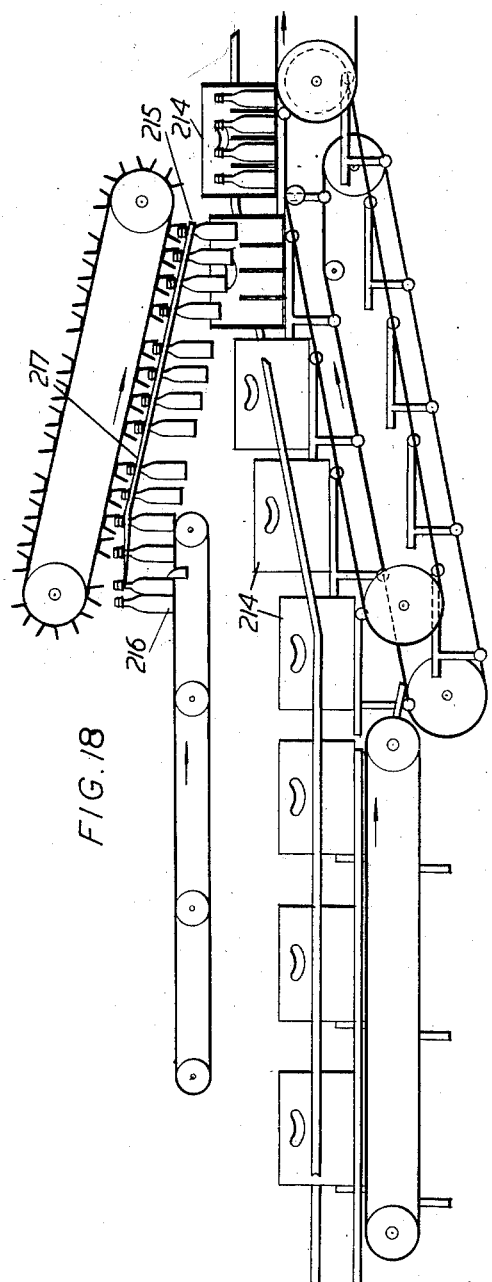

United States Patent Office 2,978,854
Patented Apr. 11, 1961

2,978,854

BOTTLE-CRATING MACHINES

Barry M. Fairest, Sheffield, England, assignor to Morgan Fairest Limited, Sheffield, England Filed Apr. 9, 1958, Ser. No. 727,359

Claims priority, application Great Britain Apr. 13, 1957

6 Claims. (Cl. 53—246)

This invention relates to machines for crating bottles of the type with a protruding rim round the mouth.

The usual form of machine for packing bottles into crates operates by assembling from parallel feed lines, equal in number to the number of bottles in each row in the crate, as many rows of bottles as there are rows in the crates, bringing an empty crate to rest below the assembly, then dropping or lowering the whole of the assembled bottles into the crate, or lifting the crate up to the bottles and lowering it with its content of bottles, and moving the filled crate away. The operation is essentially discontinuous, both as to the assembling of the bottles and the positioning of each crate to receive an assembly of bottles, and the interruption of the forward movements of both bottles and crates.

The object of the present invention is to produce a crating machine in which both the bottles and the crates proceed with much more regular motions, with consequent simplification of construction and certainty of operation. A further object is to minimise the risk of damage to the bottles, as also to the crates and to the machine itself, as they are being introduced into the crates.

A bottle-crating machine according to the invention consists essentially in means for presenting bottles in spaced sequence to a suspension feed line that supports each bottle by the protruding rim round its mouth, means for feeding a succession of crates in the same direction as and below the bottle feed line, with the crate feed and the bottle feed converging and so timed that each bottle arrives at a position directly above a crate to receive it when the convergence of feed lines has brought the bottom of the bottle close to the bottom of the crate, and means for detaching the bottle from the feed line at that position so that the bottle is deposited erect in the crate. If the crate is comparented, each bottle is detached from the feed line when the appropriate compartment is in position to receive it.

Advantageously, the crate feed line is horizontal, and the bottle feed line slopes downwardly to produce the convergence of the lines. However, the crate feed line could slope upwardly to a horizontal bottle feed line, or the bottle feed line could slope downwardly and the crate feed line slope upwardly.

There is no necessity to interrupt the forward movement of either the bottle or the crate at the position where the one enters the other. The two movements are indeed preferably uniformly continuous to and through that position.

The bottle may be allowed to drop before its bottom reaches the bottom of the crate. Thus, the convergence of the feed lines may serve to bring the bottoms of the bottles not only below the level of the wall of a crate, but also below the tops of partitions of less height than the wall and dividing the crate into compartments, when the bottles drop by less than the height of the partitions, instead of by the total height of the crate. Such deposit is very gentle.

The suspension feed line may simply comprise a pair of rails, e.g. with a plastic surface, spaced to receive the neck of a bottle just below its rim, so that the rim rests on the rails. The bottles may then be spaced along the rails by stops moving at the required feed speed. The bottles may, in the preferred use of inclined rails, slide down them to maintain contact with the stops, but it is preferable to combine each stop with a member to pass behind the rim, so that each bottle is positively located in the line. An endless chain may be used to carry the stops, which may be formed by yokes carried by the chain to embrace each bottle rim as they swing round a sprocket axis from an upper return run of the chain to follow the rails in its lower run. Flared ends to the yokes permit smooth entry of the bottle mouths, the bottle rims fitting fairly closely into the narrow part of the yokes as the bottles move along the rails.

The crates may be simply pushed along their feed path by conveyors, e.g. chain conveyors with pusher plates, moving in synchronism with the moving stops, for each compartment to arrive below a bottle when the convergence of feed paths has brought the bottom of a bottle close to the mouth of the compartment. At this position, the bottle-suspending rails end, to allow the bottle to drop gently into the compartment.

For the usual crate with several transverse rows of compartments, several feed paths side-by-side (and preferably parallel) supply simultaneously enough bottles to fill one row of the crate, each row being filled in turn. It is generally convenient for all the bottles for a row to be dropped simultaneously, since all can be dropped from minimum height, and all can be spaced along their respective feed paths by means common to all the paths. Thus, two endless chains may be bridged by transverse yoke members.

The multi-compartment crates are preferably spaced from each other, as may be desirable or necessary for the insertion of a propelling pusher behind each crate, and the bottle spacing along their feed lines must be appropriate to the compartment spacing. The yokes therefore have the desired spacing, and the bottles may be readily brought into that spacing by releasing them from a conveyor supplying the feed rails by means of a stop controlled by a cam with appropriate lifts, including a lift of long duration to allow for the gap between one crate and the next.

In general, the horizontal feed of the crates is at the same speed as that of the bottles, although this is not essential, since the short drop of each bottle into the compartment aligned below it is virtually instantaneous; and, in any case, the crate conveyor and the yoke chains may be coupled together in the machine drive for smooth continuous operation. A supply conveyor, receiving bottles from a bulk supply, and dividing them into rows, one for each feed line, may be similarly coupled in the drive, together with a release device for all the files.

The crates may be charged on to their feed conveyor by a transferrer that removes them, one at a time, from a transverse supply conveyor.

The absence of a crate from any position along the crate feed line may be used to stop the bottle movement to the feed rails over the interval that would have carried a crate from the missing position past the bottle-dropping station. Again, absence of a full complement of bottles when the next crate is ready to receive bottles may be used to prevent discharge of any bottles into that crate.

With bottles and crates both moving smoothly and continuously, with no material change of path beyond the final dropping of the bottles through a small height, the machine achieves a very high rate of crating with relatively slow movements of its few moving parts; and the use of continuous rotary and rectilinear movements for the majority of the parts conduces to simplicity of construction and ease of maintenance.

The machine may be used to crate different types of bottles, of which beer bottles and milk bottles are notable examples, into crates of different type, e.g. wood, composite wood and metal, and all-metal of strip and/or wire.

The invention will now be described in greater detail with reference to the accompanying drawings, in which—

Figure 1 is a fragmentary sectional view showing the method by which each bottle is suspended;

Figure 2 is a somewhat diagrammatic side elevation of a preferred form of machine for filling crates each having 24 bottle compartments;

Figure 3 is a plan of the machine of Figure 2, with some mechanism removed and some broken away;

Figures 4 and 5 are fragmentary side and end sectional views respectively showing means for preventing sideways swinging of the suspended bottles, Figure 4 also showing a crate-tilting device;

Figure 6 is a plan, to a larger scale than Figure 3, of bottle-distributing mechanism shown in Figure 3;

Figure 7 is a sectional elevation taken on the line VII—VII of Figure 6;

Figure 8 is a side elevation of bottle-spacing mechanism;

Figure 9 is a section on the line IX—IX of Figure 8;

Figure 10 is a side elevation of crate-supply mechanism;

Figures 13 and 14 are diagrammatic plans (not to scale) of driving connections;

Figure 15 is a diagrammatic side elevation of further driving connections;

Figure 16 shows the electrical connections of stop motion circuits;

Figure 17 shows a machine generally similar to the machine as shown in Figure 2, but with some of the mechanism modified; and Figure 18 is similar to Figure 17, but shows a further modification.

Figure 11:
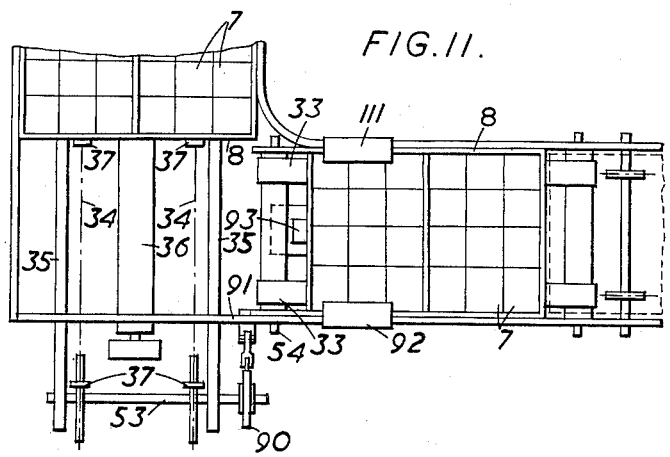
Figure 11 is a plan of Figure 10.

In Figure 1, a typical bottle 1, having a protruding rim 2 round its mouth sealed by a cap 3, rests between flat rails 4 spaced apart to fit under the shoulder 5 at the base of the rim. As shown by Figure 2, the rails 4 are inclined, and a succession of bottles 1 progresses down the rails under the control of yokes 6 projecting towards the rails 4 and each embracing the mouth of a bottle. At the bottom end of the rails 4, each bottle is free to fall away from its controlling yoke 6, to enter a predetermined compartment 7 of a moving crate 8, all the compartments being filled by the falling of the requisite number of bottles.

Figure 3 shows upright bottles 1 supplied (e.g., from a machine that has applied the caps 3) by a transverse conveyor 9 on to a rotary table 10, with guide rails 11 directing two rows of bottles on to five endless chain conveyors 12 running towards the rails 4. The chains of the conveyors 12 run on sprockets 13 (Figure 7) and carry brackets 14 to provide a continuous support for the two rows of bottles. On leaving the guide rails 11, the two rows pass between guide rails 15 of a distributor 16 pivoted about a vertical axis 17 to swing (Figure 6) from side to side to distribute the bottles over a greater width of conveyor surface, this greater width being provided by three additional chain conveyors 18 at each side of the five conveyors 12. The bottles now pass between guide rails 19 in six rows, and are supported by six only of the conveyors 12, 18 that extend to the point 20 in Figure 3. In Figure 2, the run 21 is formed by all five of the conveyors; and the run 22 is formed by all eleven of the conveyors 12 and 18. Five of the conveyors 12 and 18 do not extend into the run 23, thus leaving six conveyors for the six rows of bottles along the run 23.

Just before the end of the conveyor run 23, the bottles 1 pass between the horizontally bent front ends 24 of the rails 4, disposed at an appropriate height above the conveyor 23, and as they reach the inclined part of the rails their mouths pass into register with and inside the yokes 6, which are arranged in rows of six transversely to two endless chains 25 mounted on sprockets 26. As shown by Figure 9, the yokes 6 are formed on bars 27 carried by the chains 25.

The bottles 1 are thus suspended freely from their rims 2 on the rails 4 as the bottles cease to be supported by the conveyor run 23. The inclination of the rails 4 is such that the bottles 1 tend to slide down by gravity, and they are therefore controlled by the lower arm 6a (Figures 4 and 8) of each yoke, the upper arm 6a ensuring that the bottle does in fact slide. As the bottles approach the lower end of the rails 4, the two outside rows pass inside guide rails 28 (Figures 4 and 5) to prevent sideways swinging beyond the sides 29 of the crate 8 ready to receive them. There is also a central guide rail 30 to prevent the two middle rows of bottles from swinging over the central partition 31 of the crate.

The crates 8 are supplied from a transverse chain conveyor 32 (Figures 3 and 10), which delivers them frictionally to a rapidly driven continuation band conveyor 33 for rapid transfer to a chain conveyor 34 lying below the runs 21 and 22 of the bottle-feed conveyors. Along the conveyor 34, the crates 8 rest on stationary rails 35, and a roller 36 between these rails enables each crate to be shot on to the rails by the band conveyor 33. The chain conveyor 34 has pairs of pusher plates 37 inside the rails 35 spaced apart by substantially more than sufficient to receive each crate, which arrives across the rails before the next pair of plates 37 reaches its rear end.

The plates 37 push the crates 8 along the rails 35 until pairs of pusher plates 38 on a second chain conveyor 39 and outside the rails 35 continue the pushing of the crates below the rails 4. The plates 38 are so closely spaced that one crate follows another with only a small gap 40 between them. Therefore, the crates 8 are closely and uniformly spaced below the rails 4. The conveyor 39 and the rails 4 converge, but at the discharge end of the rails are separated by a height in excess of the height of the bottles. The plane parallel to the rails 4 and starting at the discharge end of the conveyor 23, i.e., the approximate plane assumed by the bottoms of the suspended bottles, only meets the plane of the crate conveyor 39 well beyond the discharge end of the rails 4.

Each crate 8 has twenty-four compartments 7 arranged to receive six transverse rows of four bottles each. The rails 4 suspend the bottles in six rows over the six rows of compartments, and the spacing of the bottles along the rails corresponds to the spacing of the compartments 7 in the common lengthwise direction of movement of the bottles and crates. Because of the gap 40 between consecutive crates, the yokes 6 are arranged in lengthwise groups of four, with a gap 41 between groups. The chains 25 carrying the yokes 6 move in phase with the chains 39 carrying the plates 38, so that the foremost row of six yokes 6 is aligned with the foremost row of six compartments 7 when the bottles 1 reach the lower end of the rails 4 (Figure 2), and the next three rows of bottles of six each align themselves in turn with the next three rows of compartments as they reach the same point.

The inclination of the rails 4 is such that the base of every bottle 1 can pass below the level of the top of the crate as the bottles and crates converge, and each base is lowered below that level sufficiently to ensure that when it falls it enters the compartment waiting to receive it. Preferably, the base should actually have entered the compartment before the bottle is released from the rails 4. The bottles 1 thus only fall gently by approximately the height of the compartments 7. As already described, the guide rails 28 and 30 (Figures 4 and 5) prevent side swinging of the bottles as they are about to be released. However, should a bottle by chance (as by slight swing or a defect in the edge of a compartment) rest on an edge, it can remain in this position without interfering with the continued passage of the crate, because of the excess over bottle height of the discharge ends of the rails 4.

Figure 12:
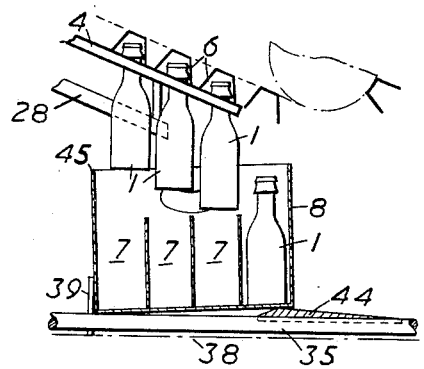
Figure 12 is a diagrammatic side view of another crate-tilting device.

Because the bottles 1 are usually a fairly close fit for the compartments 7, the higher front and rear sides of the crates 8 have the effect of restricting the passage of the first and last rows of six bottles each in each group of four rows. This is overcome as shown in Figures 4 and 12. Just before the crate 8 is about to receive its first row of bottles 1, is has passed partly over a pair of ramps 42 (one shown) on the rails 35 and thus acquires a forwardly tilted position (Figure 4), which brings the upper edge 43 of the front of the crate clear of the first row of bottles. The crate then passes on to another pair of ramps 44 (one shown), to acquire a backwardly tilted position (Figure 12), which brings the upper edge 45 of the back of the crate clear of the last row of bottles. The fully loaded crates 8 now slide along the ramps 44 and can be removed. For simplicity, the ramps 42, 44 and the resultant tilting of the crates are not shown in Figure 2.

The machine is driven by a single motor 46 (Figure 13) through a reduction gear 47. A cross shaft 48 drives the chains 39 for the pusher plates 38 through a chain 49. It also drives a shaft 50 through a chain 51. The shaft 50 drives the chains 34 for pusher plates 37 through a chain 52. The chains 34 drive a shaft 53, and this in turn drives a chain 54 through bevel gears 55. The chain 54 drives the chain conveyor 32 at relatively low speed, and the band conveyor 33 is in turn driven at a considerably higher speed through a gear-box 56 and a chain 57.

As shown in Figures 13 and 15, the shaft 50 has a sprocket 58 for a chain 59 to drive a sprocket 60 on a short shaft 61. This carries a sprocket 62, for a chain 63 to drive a sprocket 64 on a transverse shaft 65 for the run 23 of the bottle conveyors 12 and 18. A chain 66 drives the conveyors 12 and 18 in the runs 21 and 22. A chain 67 drives a shaft 68, from which a chain 69 drives bevel gears 70 for the rotary table 10, and a chain 71 drives through bevel gears 72 a vertical shaft 73 (Figure 7) at the upper end of which a connecting rod 74 provides for the rocking of the distributor 16 about its pivot 17.

In Figure 15, a chain 75 drives a gear 76 meshing with a gear 77 from which the sprockets 26 for the yoke chains 25 are driven by a chain 78.

To release the bottles 1 from the conveyor run 23 (Figure 2) in register with the grouping of the yokes 6 on the chains 25, four rows of six bottles each are released with close spacing, and then there is a wider spacing to correspond with the gap 41 between the groups of yokes. This spacing is controlled by six pairs of fingers 79 (Figure 9) upstanding from a cross bar 80 carried by two plungers 81 sliding in vertical bearings 82 at the sides of the run 23. The plungers 81 are urged downwardly by springs 83 to cams 84A, 84B, driven in synchronism, the cam 84A being driven by a chain 85 and sprocket 86 (Figure 15) from the shaft 50, and the cam 84B being driven by a chain 87 and sprocket 88 from the shaft 65 (Figure 9). The cams 84A, 84B have four lifts, one lift 89A of long duration to hold the first set of six bottles of each group for a longer period, thus providing for the gap 41, and three lifts 89B of short duration to hold the second, third, and fourth sets of six bottles each for a short period.

As now to be explained with reference to Figures 10 and 11, and the top of Figure 16, an empty crate 8 can only be received from the band conveyor 33 when the pusher plates 37 on the chain conveyor 34 will not interfere with the transfer. The shaft 53 of the conveyor 34 carries a cam 90 to control a switch 91 in series with a detector switch 92 that is closed when there is a continuous succession of crates 8 on the band conveyor passing above the position occupied by a stop 93. The cam 90 closes the switch 91 when the plates 37 of the conveyor 34 lie to each side of the path of a crate that is to be shot from the conveyor 33, a relay 94 (Figure 16) being actuated by the switch 91 to withdraw the stop 93 by one solenoid 95. If the switch 92 is not closed by a crate in position to be shot to the conveyor 34, the stop 93 is positively held raised by a second solenoid 95A, to retain the next crate until the cam 90 again closes the switch 91.

When the crates 8 lie in continuous succession on the conveyors 32, 33, the switch 92 is continuously closed and this results in the stop 93 being continuously held down. Then the conveyor 33 shoots one crate rapidly on to the conveyor 34 and the next crate on the conveyor 33 is pressed forward until its end rests against the side of the crate that has just been shot on to the conveyor 34. As soon as that shot crate has moved away, the next crate is shot from the conveyor 33. During this continuous supply of crates, the stop 93 is held down because, as shown in Figure 16, a switch 96 also operated by the relay 94 is closed while the solenoid 95 is energised. The switch 96 then by-passes the switch 91, and maintains the relay 94 in its position to keep the solenoid 95 energised, regardless of the opening and closing of the switch 91 by the cam 92 driven by the conveyor 34.

Ideally, the conveyor 34 is completely filled with empty crates, but if there is an interruption in the supply of crates to the chain conveyor 32, any resultant gap on the chain conveyor 34 brings into operation further safety devices. The first of these consists of a detector switch 97, which is left open if a crate is absent, and this prevents bottles from being released from the conveyor run 23 to the rails 4. The switch 97 is in series with six detector switches 98 disposed above the six rows of bottles 1 near the end of the conveyor run 23. Also in series with the switches 97, 98 is a switch 99 (Figure 9) actuated by a cam 100 driven by gears 101 from the sprocket 86. The cam 100 has a long lift 102 (Figure 8), and this lift serves to open the switch 99 for a period before a short lift 103 of a similar cam 104 driven by gears 105 from the sprocket 88 momentarily closes a switch 106. So long, therefore, as there is no absence of crate to open the switch 97 and no absence of a bottle from any of the six rows to open any of the switches 98, a relay 107 is energized to de-energise two solenoids 108, when springs 109 are free to withdraw dogs 110 from below the ends of the cross bar 80 carrying the fingers 79 that effect release of the bottles. The operation of the cams 100 and 104 is appropriately phased with the chain conveyor 39 on which a crate rests when detected by the switch 97. The switches 98 detect bottles 1 in the fourth position in advance of the fingers 79, so that there must be assembled a full set of twenty-four bottles before the fingers 79 can release the first set of six bottles of the twenty-four required to fill completely the crate the presence of which has been detected by the switch 97.

With this condition satisfied, the long duration lift 89A of the two cams 84A, 84B has just lifted the fingers 79 when the long lift 102 of the cam 100 begins to open the switch 99 and keeps the switch 99 open while the fingers 79 remain lifted. At the end of the long lift of the fingers 79, the cam 100 allows the switch 99 to close and it remains closed while the fingers 79 are raised briefly three times by the short lifts 89B of the cams 84A, 84B. At the end of the long lift of the fingers 79, the short lift 103 of the cam 104 momentarily closes the switch 106, and before the switch 106 again opens the switch 99 is closed by the end of the long lift 102 of the cam 100. As a result, the correct assembly of the full twenty-four bottles, and the presence of a crate to receive them, ensures that the relay 107 remains energized over the period when the last three sets of six bottles are being released in spaced sequence by the fingers 79, because the switch 99 is closed over that period. The switch 99 therefore serves to hold the relay 107 energised after it has been initially energised by the momentary closing of the switch 106. Of course, if any bottle is absent, or if there is no crate in position, the resultant opening of one of the switches 98 or of the switch 97 prevents the switch 106 from energising the relay, and the dogs 110 are not withdrawn. The crate will not receive any bottles, and bottles are not released until the full set of twenty-four has been accumulated in front of the fingers 79, and another crate has come into position to receive those bottles.

The long lift 89A of the two cams 84A, 84B produces the necessary spacing between each set of twenty-four bottles to correspond to the gap 41 in the sequence of the yokes 6 and the gap 40 between the crates 8.

The next safety device utilises a detector switch 111 that is closed so long as there is a crate 8 on the band conveyor 33 ready to be shot on to the conveyor 34, together with two detector switches 112, 113 to be actuated by crates that have passed the position at which the bottles fall from the rails 4. The switches 112, 113 are spaced close enough for one or both always to be closed so long as there is a crate 8 to pass beneath them. The switch 113 is a two-way switch. If all the switches 111, 112, 113 are not actuated simultaneously by crates, the motor 46 is stopped. The motor 46 is started by a push button 114 to close contacts 115 to complete a circuit through relays 116, 117 and through the side of the switch 113 that is closed when the switch 113 is not actuated by a crate. The relay 117 closes a switch 118 in the circuit of two switches 119 and a push-button "Stop" switch 120, all in series with the starter switch 121 for the motor 46 and with an overload switch 122 and a relay 123 for the main motor switch 124. The closing of the starter switch 121 by the push-button 114 energises a relay 125 to close a holding switch 126, so that the push-button 114 may now be released. The relay 116 still being energised, it has closed a switch 127 to maintain the circuit through the relays 116, 117, despite the opening of the contacts 115. As soon as crates are fed from the chain conveyor 32, the switch 111 is kept closed, but remains ineffective. Eventually, the first crate passes the switches 112, 113 in turn, first closing the switch 112 and then moving the switch 113 (while switch 112 is still closed) to its second side, in series with the switches 119 etc., and thus breaking the circuit through the switch 127, which deenergises the relays 116, 117. The switch 118 is thus opened, and control of the motor 46 is solely by the switches 111, 112, 113.

It has already been explained that if a crate is absent in the feed to the conveyor 39, the corresponding set of twenty-four bottles is held by the fingers 79 from passing to the rails 4. The safety device that provides for this continues to operate even if several crates are absent in succession. However, if the crate supply is completely exhausted, the second safety device including the switches 111, 112, 113 operates to bring the machine to rest after the last crate has passed the position at which the bottles fall from the rails 4. Complete absence of crates at the conveyors 32, 33 leaves the switch 111 open, but the switches 112, 113 continue to be actuated until the last crate has passed them. Then, the switch 112 being open and the switch 113 being moved from the circuit of the switches 119 etc., that circuit is completely open and the motor stops. The machine now cannot be restarted, except by operation of the "Start" push-button 114, to bring the relays 116, 117 again into control of the motor circuit until a fresh supply of crates enables the first safety device to release bottles for those crates.

In the event of occasional absence of a crate in the supply of crates, the switches 112, 113 will not be operated for a brief interval, but so long as the switch 111 is kept closed by crates at the conveyor 37 the relay 117 is re-energised via the switch 113 now in its first position and the switch 111, and the motor circuit is maintained because the relay 117 closes the switch 118.

If occasionally an absent crate causes non-operation of the switches 112, 113 at a moment when the absence of a crate at the conveyor 33 opens the switch 111, the machine comes to rest, but this coincidence happens very rarely in practice.

The switches 119 are positioned over the lower run of each chain 25 for the yokes 6 (Figure 2) and are opened if any bottle 1 happens to rest on the top edge of a crate 8. This interferes with the descent of the bottle, and the bottle presses the bar 27 carrying the yoke 6 for that bottle upwardly to lift one or both of two bars 128 into actuating contact with one or both of the switches 119. The bars 128 are suspended by parallel links 129. The resultant opening of either switch 119 breaks the motor circuit. The motor preferably has an automatic brake, to stop the machine as quickly as possible. The operator can, of course, stop the machine at any time by the "Stop" push-button 120, in the same circuit as the switches 119.

In Figure 17, bottles 201, distributed as before described into rows, reach a conveyor run 202, where they are first detained by fingers at 203, and then released in sequence of four from each row, to pass between pairs of horizontal rails 204, for the mouth of each bottle to be embraced by a yoke 205 projecting from endless chains 206 running round sprockets 207. The yokes 205 are in groups of four and the movement of the chains 206 carries along the rails groups of bottles spaced in accordance with the spacing of compartments 208 of crates 209, there being as many rows of bottles as there are rows of compartments in each crate.

The crates 209 are carried by a conveyor 210 to the foot of an inclined conveyor 211 with platforms 212 to keep the crates horizontal as they rise towards the rails 204, and to the grouped bottles 201 suspended from the rails. Before any crate 209 reaches the end 213 of the rails 4, the bottles have entered it and lie above the compartments 208. As the bottles are pushed by the yokes 205 beyond the point 213, they drop successively into the compartments of the moving crate.

In Figure 18, not only do the crates 214 ascend towards the end 215 where the bottles 216 drop from rails 217, but the rails 217 also descend to that point.

What I claim is:

1. A crating machine for bottles with protruding rims round their mouths, comprising parallel and downwardly and continuously inclined suspension feed lines to support rows of bottles each by its rim, means for feeding a succession of compartmented crates horizontally below the bottle feed lines towards the bottom of those lines, with a compartment of a crate below each line, and ramps over which the crates pass in succession to tilt them forwardly as they reach the position at which the bottles are released at the bottom of the lines into the first compartments of a crate and then rearwardly as bottles are released into the last compartments of the crate.

2. A crating machine for bottles with protruding rims round their mouths, comprising a lengthwise bottle conveyor on which the bottles may be stood upright, means to guide bottles in a line on the conveyor, means to drive the conveyor to carry the bottles successively to the discharge end of the conveyor, a suspension feed line extending from the discharge end of the conveyor in the same lengthwise direction as the conveyor, the feed line starting at a height above that end such that a bottle at the discharge end is engaged by its protruding rim in the suspension feed line, means for releasing bottles successively from the conveyor to the suspension feed line, and a crate conveyor below and in the same lengthwise direction as the suspension feed line, means for controlling the rate of movement of bottles along the suspension feed line, means for moving the crate conveyor in phase with the rate of bottle movement, the crate conveyor gradually converging towards a plane parallel to the suspension feed line from the level of the discharge end of the conveyor, the plane being the approximate plane assumed by the bottoms of the suspension bottles, and the suspension feed line ending before the point of convergence, together with means for releasing the bottles at the end of the suspension feed line, for the bottles to fall erect into the crates over a distance represented by the height of the bottom of each bottle at such release from the crate conveyor immediately below the point of release.

3. A crating machine as in claim 2, wherein the bottle conveyor is wide enough for a plurality of lines of bottles, with means for guiding the bottles into parallel lines, and a suspension feed line is provided for each such line of bottles, with stop means for effecting the simultaneous release of a transverse row of bottles from the several lines at the discharge end of the conveyor for engagement by the corresponding suspension feed lines, and means for guiding each transverse row of bottles along the suspension feed lines for eventual simultaneous falling of the row into a crate on the crate conveyor.

4. A crating machine for bottles with protruding rims round their mouths, comprising a pair of rails spaced a fixed distance apart, means to release bottles successively into one end of the rails for each bottle to be suspended by its rim and only able to escape at the other end of the rails, means for keeping the bottles in spaced continuously moving sequence along the rails, a crate conveyor below and gradually converging towards the other end of the rails, and means for moving the crate conveyor continuously and in phase with the moving bottle sequence so that an empty crate moving with the conveyor receives successive bottles as the bottles fall when they are allowed to escape by reaching that other end of the rails.

5. A crating machine for bottles with protruding rims round their mouths, comprising a pair of rails spaced a fixed distance apart, means to release bottles successively into one end of the rails for each bottle to be suspended by its rim and only able to escape at the other end of the rails, an endless chain with a lower run above and parallel to the rails, yokes on the chain to embrace each bottle mouth, means to drive the chain so that the yokes keep in spaced moving sequence the bottles retained in suspension along the whole length of the rails until each bottle is carried beyond that other end of the rails to escape both the rails and its spacing yoke, a crate conveyor below and gradually converging towards the other end of the rails, and means for moving the crate conveyor continuously and in phase with the endless chain so that an empty crate moving with the conveyor receives successive bottles as the bottles fall when they escape from the rails.

6. A crating machine for bottles with protruding rims round their mouths, comprising a number of downwardly and continuously inclined pairs of rails side by side, the rails of each pair being spaced a fixed distance apart, successively operable means to release simultaneously at each operation into the upper end of all the pairs of rails a number of bottles to form successive transverse rows of bottles all suspended by their rims and held inescapable until they reach the lower end of the rails, endless chains, each with lower runs above and parallel to the rails, yoke bars carried transversely between the chains, yokes on the bars to embrace the mouths of the rows of suspended bottles, a horizontal crate conveyor below the rails, and means to move the endless chains and the crate conveyor continuously and in phase with each other for an empty crate moving with the conveyor to receive successive transverse rows of bottles when these are allowed to fall by escaping from both the yokes and the lower end of the rails on passing beyond that lower end.

References Cited in the file of this patent

UNITED STATES PATENTS

| | | |
|---|---|---|
| 1,612,444 | Kimball et al. | Dec. 28, 1926 |
| 2,213,774 | Taylor | Sept. 3, 1940 |
| 2,308,188 | Madden | Jan. 12, 1943 |
| 2,608,308 | Taylor | Aug. 26, 1952 |
| 2,615,289 | Hickin | Oct. 28, 1952 |
| 2,666,562 | Birch | Jan. 19, 1954 |
| 2,684,800 | Lewis | July 27, 1954 |
| 2,685,358 | Heil et al. | Aug. 3, 1954 |
| 2,735,599 | Thurman | Feb. 21, 1956 |
| 2,819,576 | Hendricks et al. | Jan. 14, 1958 |
| 2,822,912 | Wehmiller et al. | Feb. 11, 1958 |
| 2,845,759 | Cote et al. | Aug. 5, 1958 |